(12) United States Patent
Schierling et al.

(10) Patent No.: US 6,448,674 B1
(45) Date of Patent: Sep. 10, 2002

(54) DRIVE SYSTEM

(75) Inventors: Bernhard Schierling, Kürnach;
Alexander Manger, Grettstadt;
Benedikt Schauder, Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/659,464

(22) Filed: Sep. 11, 2000

(30) Foreign Application Priority Data

Sep. 9, 1999 (DE) .......................... 199 43 038

(51) Int. Cl.[7] .............................................. H02K 7/00
(52) U.S. Cl. .................... 310/42; 310/75 R; 310/91; 310/112
(58) Field of Search ............................. 310/42, 75 R, 310/91, 74, 78, 79, 112

(56) References Cited

U.S. PATENT DOCUMENTS

| | | | | |
|---|---|---|---|---|
| 4,021,690 A | * | 5/1977 | Burton ..................... | 310/67 R |
| 4,203,710 A | * | 5/1980 | Farr ........................... | 310/74 |
| 5,163,528 A | * | 11/1992 | Kawamoto et al. ........... | 310/83 |
| 5,831,355 A | * | 11/1998 | Oku ........................... | 310/42 |
| 5,942,820 A | * | 8/1999 | Yoshida .................... | 310/67 R |
| 5,952,746 A | * | 9/1999 | Mittmann et al. ............ | 310/42 |

FOREIGN PATENT DOCUMENTS

| | | | | |
|---|---|---|---|---|
| DE | 196 31 384 C1 | 10/1997 | ............ | H02K/7/00 |

* cited by examiner

Primary Examiner—Burton S. Mullins
(74) Attorney, Agent, or Firm—Cohen, Pontani, Lieberman & Pavane

(57) ABSTRACT

A drive system having an electric machine, by which a drive shaft of a drive assembly is capable of being driven in rotation and/or electric energy is capable of being recovered during the rotation of the drive shaft. The electric machine has a stator arrangement and a rotor arrangement connected or connectable to the drive shaft for joint rotation about an axis of rotation. A positive guidance arrangement is provided via which the rotor arrangement and the stator arrangement are guided relative to one another when a relative axial movement is carried out for assembling or dismantling the electric machine.

43 Claims, 11 Drawing Sheets

DRIVE SYSTEM

BACKGROUND OF THE INVENTION

1. Field of the Invention

The present invention relates to a drive system, in particular for a vehicle, comprising an electric machine, by means of which a drive shaft of a drive assembly is capable of being driven in rotation and/or electric energy is capable of being recovered during the rotation of the drive shaft. The electric machine has a stator arrangement and a rotor arrangement connected or connectable to the drive shaft for joint rotation about an axis of rotation.

2. Discussion of the Prior Art

A drive system of this type, in which the rotor arrangement is excited permanent-magnetically, is known from German reference DE 196 31 384 C1. When drive systems of this type are being assembled or dismantled, there is the problem that, because of the permanent-magnetic excitation of the rotor arrangement and because of the relatively small airgap between the rotor arrangement and the stator arrangement, said airgap then being formed in the assembled state, when a system of this type is being mounted with a high degree of precision, care must be taken to ensure that the rotor arrangement does not come into contact with the stator arrangement, since, because of magnetic attraction, these would then immediately adhere to one another and could ultimately no longer be separated or, if such separation were to take place, there would be a great risk that one of the subassemblies would be damaged. Even in the case of rotor arrangements not excited permanent-magnetically, there is the problem that if there is insufficiently accurate guidance during the axial relative movement between the rotor arrangement and stator arrangement, the various subassemblies may be damaged due to mutual contact and to their sliding on one another.

SUMMARY OF THE INVENTION

The object according to the present invention is, therefore, to design a generic drive system in such a way that, when relative movements between the rotor arrangement and stator arrangement are carried out, for example when the electric machine is assembled or dismantled, mutual contact between these two subassemblies can be avoided.

This object is achieved, according to the present invention, by means of a drive system, in particular for a vehicle, comprising an electric machine, by means of which a drive shaft of a drive assembly is capable of being driven in rotation and/or electric energy is capable of being recovered during the rotation of the drive shaft. The electric machine has a stator arrangement and a rotor arrangement connected or connectable to the drive shaft for joint rotation about an axis of rotation.

Furthermore, in this drive system according to the invention, a positive guidance arrangement is provided, by means of which the rotor arrangement and the stator arrangement are guided relative to one another when a relative axial movement is carried out in order to assemble or dismantle the electric machine.

Care is therefore taken, by the provision of the positive guidance arrangement, to ensure that, when a relative axial movement is carried out between the rotor arrangement and the stator arrangement, mutual contact between these subassemblies in the critical regions, that is to say the region of interaction, is necessarily avoided. As a result, the mounting operation can be carried out in a markedly simpler way, for example even by hand, without the use of precision-guidance machine tools.

According to a first embodiment, the drive system according to the invention may be designed such that the positive guidance arrangement comprises a positive guidance unit and such that positive guidance interaction is generated between the rotor arrangement and the positive guidance unit positioned or positionable in a predetermined position on the drive shaft. At the same time, there may, for example, be provision for the positive guidance unit to be positioned or positionable in the predetermined position before the rotor arrangement is moved axially up to the stator arrangement, and for a guidance portion of the rotor arrangement to be capable of being guided along the positive guidance unit. In order to simplify the mounting operation, but make sure that no unintended rattling noises or unbalances occur during rotary operation, it is proposed that, after the axial guidance of the rotor arrangement relative to the stator arrangement has taken place, the positive guidance unit is held together with or by the rotor arrangement on the drive shaft. Alternatively, however, it is also possible, after axial guidance of the rotor arrangement relative to the stator arrangement has taken place, for the positive guidance unit to be capable of being removed from the region of the rotor arrangement.

The exact positioning of the positive guidance unit relative to the drive shaft and therefore exact positioning of the rotor arrangement relative to the stator arrangement can be obtained by the provision, on the drive shaft, of a positioning arrangement, by means of which the positive guidance unit is positioned or positionable in the predetermined position relative to the drive shaft.

According to a further embodiment of the present invention, there may be provision for the positive guidance arrangement to be designed for generating positive guidance interaction between the stator arrangement and the rotor arrangement. This may be implemented in that the positive guidance arrangement comprises a first positive guidance region on the stator arrangement and a second positive guidance region on the rotor arrangement. The second positive guidance region is guided along the first positive guidance region during relative axial movement between the stator arrangement and rotor arrangement. There may be provision, for example, for the first positive guidance region to comprise a first positive guidance portion on the stator arrangement and for the second positive guidance region to comprise a second positive guidance portion on a portion of the rotor arrangement connected or connectable to the drive shaft.

In an arrangement in which positive guidance occurs between components or subassemblies which, during subsequent operation, then have to be movable relative to one another, there is the problem that, because of the low tolerances in the region of positive guidance, abrasion or impact could then occur during rotary operation, even when the unevenness of movement is only minimal. In order to avoid this, it is proposed that, when the electric machine is being assembled, the first and second positive guidance portions provide essentially no positive guidance between the stator arrangement and the rotor arrangement in an end region of the relative axial movement of the rotor arrangement with respect to the stator arrangement.

However, even in an embodiment of this type, care must be taken to ensure that, during the entire axial movement action, mutual contacting between the rotor arrangement and stator arrangement is avoided in the critical regions. This may then be achieved, for example, by the positive guidance arrangement comprising a third positive guidance region and, in the end region of the relative axial movement, by the first positive guidance region and/or the second positive guidance region providing, together with the third positive guidance region, positive guidance of the stator arrangement relative to the rotor arrangement.

A practical embodiment which can be made up in a particularly simple way may be obtained, here, if the third positive guidance region is provided on the drive shaft and comprises a third positive guidance portion, and if the second positive guidance region on the rotor arrangement comprises a fourth positive guidance portion for interaction with the third positive guidance portion. Alternatively or additionally, however, there may be provision for the third positive guidance region on a fixed component, preferably the drive assembly, to comprise a third positive guidance portion, and for the first positive guidance region to comprise a fourth positive guidance portion, preferably formed by the first positive guidance portion, for interaction with the third positive guidance portion on the fixed component.

So that no additional components or subassemblies have to be provided for the positive guidance function, but, instead, so that already existing components or parts thereof can be used, it is proposed that the first positive guidance region comprises as the first positive guidance portion a surface region, preferably an inner surface region, on a stator carrier of the stator arrangement, and that the second positive guidance region comprises an essentially cylindrical portion of the rotor arrangement, said portion being displaceable at least with a surface region, preferably an outer surface region, as a second positive guidance portion, along the first positive guidance portion.

There may also be provision for the third positive guidance region to comprise an axial projection on the drive shaft, with a surface region, preferably an outer surface region, as the third positive guidance portion, and for the second positive guidance region to comprise as the fourth positive guidance portion, a surface region preferably an inner surface region, of an essentially cylindrical portion of the rotor arrangement.

Alternatively or additionally, it is again possible, here too, for the third positive guidance region to comprise as the third positive guidance portion a surface region, preferably an outer surface region, of a fixed component, and for the first positive guidance region to comprise as the fourth positive guidance portion a surface region, preferably inner surface region, of the stator arrangement.

In order, at the same time, to make a uniform relative axial movement possible, it is proposed that the third positive guidance portion and the second positive guidance portion comprise surface regions adjoining one another essentially flush.

The positive guidance concept according to the invention may, as illustrated above, be based on first mounting one of the subassemblies, namely the rotor arrangement and the stator arrangement, and then moving the other up to it. Although this is a particularly practical concept, it is also conceivable, however, for systems of this type to be produced by a supplier and then be attached as a complete unit to the drive assembly. According to a further aspect of the present invention, therefore, it is proposed that, after relative axial movement between the rotor arrangement and the stator arrangement has been carried out for assembling the electric machine, the rotor arrangement and the stator arrangement are combined to form a premounted subassembly.

According to a further embodiment of the present invention, there may be provision for the positive guidance arrangement to be designed for generating positive guidance interaction between the rotor arrangement and a fixed component. In this case, it is advantageous if the fixed component is provided on the drive assembly. A small axial overall size of an entire drive for a vehicle is obtained in this way.

In this embodiment of a system according to the invention, there may then be provision for the fixed component to comprise or form a first positive guidance region and for the rotor arrangement to comprise a second positive guidance region which is guided along the first positive guidance region during relative axial movement between the rotor arrangement and the stator arrangement. For example, the first positive guidance region may comprise a first positive guidance portion, and the second positive guidance region may comprise a second positive guidance portion for interaction with the first positive guidance portion.

Here too, a system is provided again, in which positive guidance occurs between subassemblies which must move relative to one another during subsequent rotary operation. In order once again to avoid the situation where these two subassemblies unintentionally abrade one another or come into contact during rotary operation, it is proposed that, when the electric machine is being assembled, the first and the second positive guidance portions provide essentially no positive guidance between the stator arrangement and the rotor arrangement in an end region of the relative axial movement of the rotor arrangement with respect to the stator arrangement.

Since it is nevertheless advantageous, even in this embodiment, to ensure positive guidance over the entire axial movement, up to the finished mounting position, it is proposed that the positive guidance arrangement comprise a third positive guidance region, and that the first positive guidance region and/or the second positive guidance region provide, together with the third positive guidance region, positive guidance of the stator arrangement relative to the rotor arrangement in the end region of the relative axial movement.

For this purpose, for example, the makeup may be such that the third positive guidance region is provided on the drive shaft and comprises a third positive guidance portion, and such that the second positive guidance region on the rotor arrangement comprises a fourth positive guidance portion for interaction with the third positive guidance portion.

An embodiment to be implemented particularly easily may be obtained if the third positive guidance region comprises an axial projection on the drive shaft, with a surface region, preferably an outer surface region, as the third positive guidance portion, and if the second positive guidance region comprises as the fourth positive guidance portion a surface region, preferably an inner surface region, of an essentially cylindrical portion of the rotor arrangement.

There may also be provision for the first positive guidance region to comprise as the first positive guidance portion a surface region, preferably an inner surface region, of the fixed component, and for the second positive guidance region to comprise as the second positive guidance portion a surface region, preferably an outer surface region, of an essentially cylindrical portion of the rotor arrangement.

The present invention is particularly suitable for use in systems in which, when the electric machine is in the assembled state, the stator arrangement and the rotor arrangement are arranged so as to overlap one another axially, at least in regions.

According to a further alternative embodiment, the positive guidance may be obtained in that the positive guidance arrangement comprises a positive guidance element which, before the rotor arrangement and the stator arrangement are moved axially toward one another, can be arranged on a rotor-arrangement surface region to be positioned facing the stator arrangement or can be arranged on a stator-arrangement surface region to be positioned facing the rotor arrangement. This positive guidance element ensures that, when the relative axial movement is carried out, the critical regions of the two subassemblies, namely the rotor arrangement and the stator arrangement, cannot come directly into contact with one another, but are separated by the positive guidance element. As a result, on the one hand, damage to the two subassemblies is avoided and, on the other hand, care is taken to ensure that, particularly in the case of permanent-magnetically excited rotor arrangements, because of the interspace which is maintained the magnetic attraction forces which occur do not become so high that further axial displacement of the two subassemblies relative to one another will no longer be possible.

For example, there may be provision for the positive guidance element to be essentially hollow-cylindrical and to be produced preferably from elastic material.

A particularly simple embodiment to be implemented cost-effectively may be obtained if the positive guidance element has a net-like structure.

In order, on the one hand, to ensure that the necessary positive guidance is generated with the desired effect of minimizing or keeping low the magnetic interaction which occurs, but, on the other hand, also to allow manual assembly, it is proposed that the positive guidance element have a thickness which is slightly smaller, preferably approximately 0.2 mm smaller, than an airgap formed between the rotor arrangement and the stator arrangement after the axial movement toward one another has taken place.

The use of a positive guidance element of this type, which protectively surrounds the rotor arrangement or the stator arrangement, is particularly advantageous because, after mounting has taken place, this positive guidance element can then be removed and therefore no components serving for positive guidance have to be left on the drive system, and, furthermore, this positive guidance element can be used for a further mounting operation.

The present invention relates, furthermore, to a method for assembling or/and dismantling a rotor arrangement and a stator arrangement of an electric machine, by means of which electric machine a drive shaft of a drive assembly is capable of being driven in rotation and/or electric energy is capable of being recovered during the rotation of the drive shaft. The method including moving the rotor arrangement and the stator arrangement relative to one another in the direction of an axis of rotation, during which relative movement the rotor arrangement and the stator arrangement are positively guided relative to one another.

As already referred to above, in a method of this type, the procedure may be such that, before the relative axial movement between the rotor arrangement and stator arrangement is carried out, the rotor arrangement is mounted on the drive shaft or the stator arrangement is mounted on a fixed subassembly, preferably the drive assembly.

Alternatively, for providing a premounted subassembly, it is possible for the relative axial movement between the rotor arrangement and the stator arrangement for assembling the electric machine to be carried out before the rotor arrangement is mounted on the drive shaft and before the stator arrangement is mounted on a fixed subassembly, preferably the drive assembly.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIGS. 10–10b show a partial longitudinal sectional view of a drive system according to the invention, with a further alternative embodiment of a positive guidance arrangement, in a state before the relative axial movement between the rotor arrangement and stator arrangement is carried out.

DETAILED DESCRIPTION OF THE PREFERRED EMBODIMENTS

Figure 1:
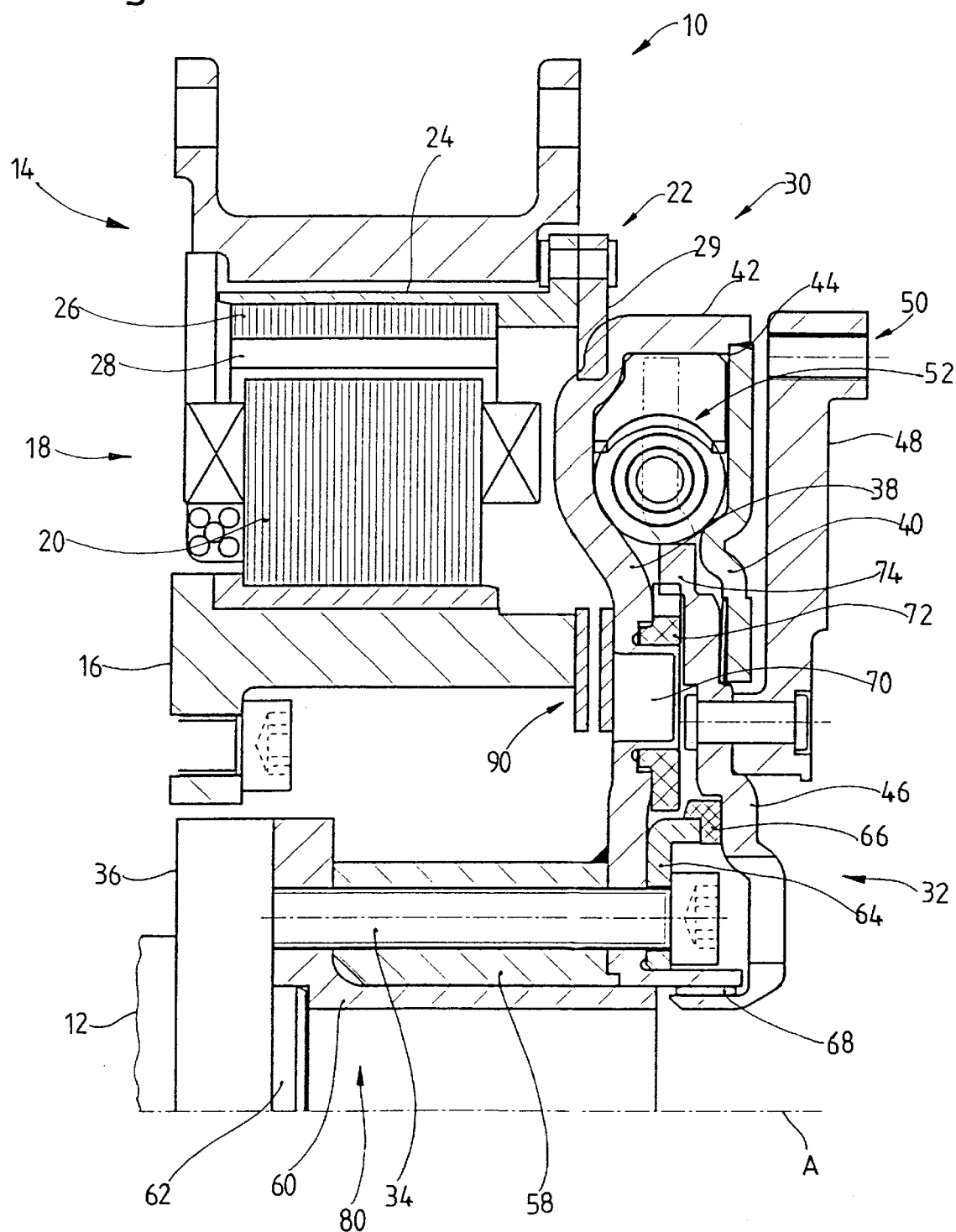
FIG. 1 shows a partial longitudinal sectional view of a drive system according to the invention with a positive guidance arrangement.

FIG. 1 shows a first embodiment of a drive system 10 according to the invention, which ultimately forms a starter/alternator arrangement for an internal combustion engine which is not illustrated. That is to say, in the starter mode, a merely suggested drive shaft or crankshaft 12 of the internal combustion engine can be driven in rotation, in order to start the drive assembly, i.e., the internal combustion engine, and, in the alternator mode, electric energy can be recovered during the rotary operation of the drive assembly and be fed into an electric system or an accumulator.

The drive system 10 comprises an electric machine 14 with a stator arrangement 18 carried by a stator carrier 16, for example on the drive assembly, and having a plurality of stator coils 20. The electric machine 14 has, furthermore, a rotor arrangement 22 with a rotor body 24, for example made of aluminum, which carries on its inner circumferential surface a plurality of rotor laminations 26, for example in ring-like form. The rotor laminations 26 form a rotor yoke for permanent magnets 28 carried on an inner circumferential surface the laminations 26. It can therefore be seen that the electric machine 14 is a synchronous external rotor machine with a permanently excited rotor. The rotor body 24 is connected for joint rotation, via a riveted-on connecting part 29, to a primary side 30 of a torsional vibration damper arrangement 32 which ultimately forms part of the rotor arrangement 22. This primary side 30 of the torsional vibration damper arrangement 32 is fixed, furthermore, to a shaft flange 36 of the crankshaft 12 via a plurality of fastening screws 34. The primary side 30 of the torsional vibration damper arrangement 32 comprises two cover disk elements 38, 40. The cover disk element 38 has a potlike design and is connected, for example by welding, with a radially outer region 42 extending essentially axially with respect to the axis of rotation A, to the cover disk element 40 and, furthermore, is connected to the connecting part 29 by welding. Into the annular space 44 formed between the cover disk elements 38, 40 engages a central disk element 46 which forms essentially, together with a flywheel mass 48, a secondary side 50 of the torsional vibration damper arrangement 32. The flywheel mass 48, to which, for example, a thrust plate subassembly of a friction clutch may be fixed, is firmly connected to the central disk element 46 by riveting or the like radially within the cover disk element 38. The secondary side 50 of the torsional vibration damper arrangement 32 may, of course, also be connected directly, for example, to a transmission input shaft or a following drive train.

Between the primary side 30, that is to say the cover disk elements 38, 40, and the secondary side 50, that is to say the central disk element 46, there acts in a way known per se a damper spring arrangement 52. The damper springs or groups of damper springs of the damper spring arrangement 52 are capable of being supported in the circumferential direction on the primary side 30 and the secondary side 50 of the torsional vibration damper arrangement 32 and thus allow relative rotation between the primary side 30 and the secondary side 50, with the springs of the damper spring arrangement 52 being compressed at the same time. The support on the primary side 30 or the secondary side 50 may take place via spring blocks or sliding blocks which can slide on the axially extending portion 42 of the cover disk element 38.

In the radially inner region, the cover disk element 38 is firmly connected, for example by welding, to a spacer sleeve 58. Furthermore, a positive guidance sleeve, designated overall by 60, is provided as a positive guidance unit, which is self-centered on the centering projection 62 of the crankshaft 12 and which, when the rotor arrangement 22 comprising the torsional vibration damper arrangement 32 is guided up to the stator arrangement 18 during the assembly of the electric machine 14, guides the spacer sleeve 58 and thus ensures that the rotor arrangement 22 cannot come into contact with the stator arrangement 18. The spacer sleeve 58 and the positive guidance sleeve 60 have passing through them the screw bolts 34, by means of which the cover disk element 38 and therefore the primary side 30 of the torsional vibration damper arrangement 32 are secured to the crankshaft flange 36.

It may also be pointed out that, in the radially inner region, a ring-like bearing element 64 is likewise secured by means of the screw bolts 34 with respect to the cover disk element 38, on which the central disk element 46 is supported axially, with the axial sliding bearing 66 interposed. The radial mounting of the primary side 30 with respect to the secondary side 50 is carried out by means of a rolling body bearing or sliding bearing 68 which is positioned between two essentially axially extending cylindrical portions of the cover disk element 38 or of the central disk element 46. It may also be pointed out, furthermore, that the cover disk element 38 has formed on it a plurality of pot-like shaped-out portions 70, on which a planet wheel 72 is carried rotatably in each case. The planet wheel meshes with a shaped-out toothing 74 of the central disk element 46 which, as a ring gear, thus drives the planet wheels 72 in rotation during relative rotation between the primary side 30 and the secondary side 50. Since the space 44 is filled with viscous fluid, the planet wheels 72 then rotate at the same time in the viscous medium and the displacement of the latter leads to the discharge of vibrational energy.

It may also be pointed out, furthermore, that, in the drive system 10 according to the invention, a rotary-position transmitter 90 is preferably provided, which detects the rotary position of the torsional vibration damper arrangement 32 or of the rotor arrangement 22, this being important, in particular, for commutating the stator coils 20.

As regards assembly, it may also be noted that, as a first work step, the stator arrangement 18 is secured with a stator carrier 16, for example, to an engine block, and, in this case, the stator carrier 16 may form, for example, an intermediate transmission case, to which a transmission can then be screwed. Subsequently, as described above, the rotor arrangement 22, together with the torsional vibration damper arrangement 32, is guided up axially, and, by virtue of the positive guidance arrangement 80, which comprises essentially the positive guidance sleeve 60, care is taken, even during this assembly operation and, of course, also when the electric machine 14 is being dismantled, to ensure that the airgap between the rotor arrangement 22 and the stator arrangement 18 is maintained.

Figure 2:
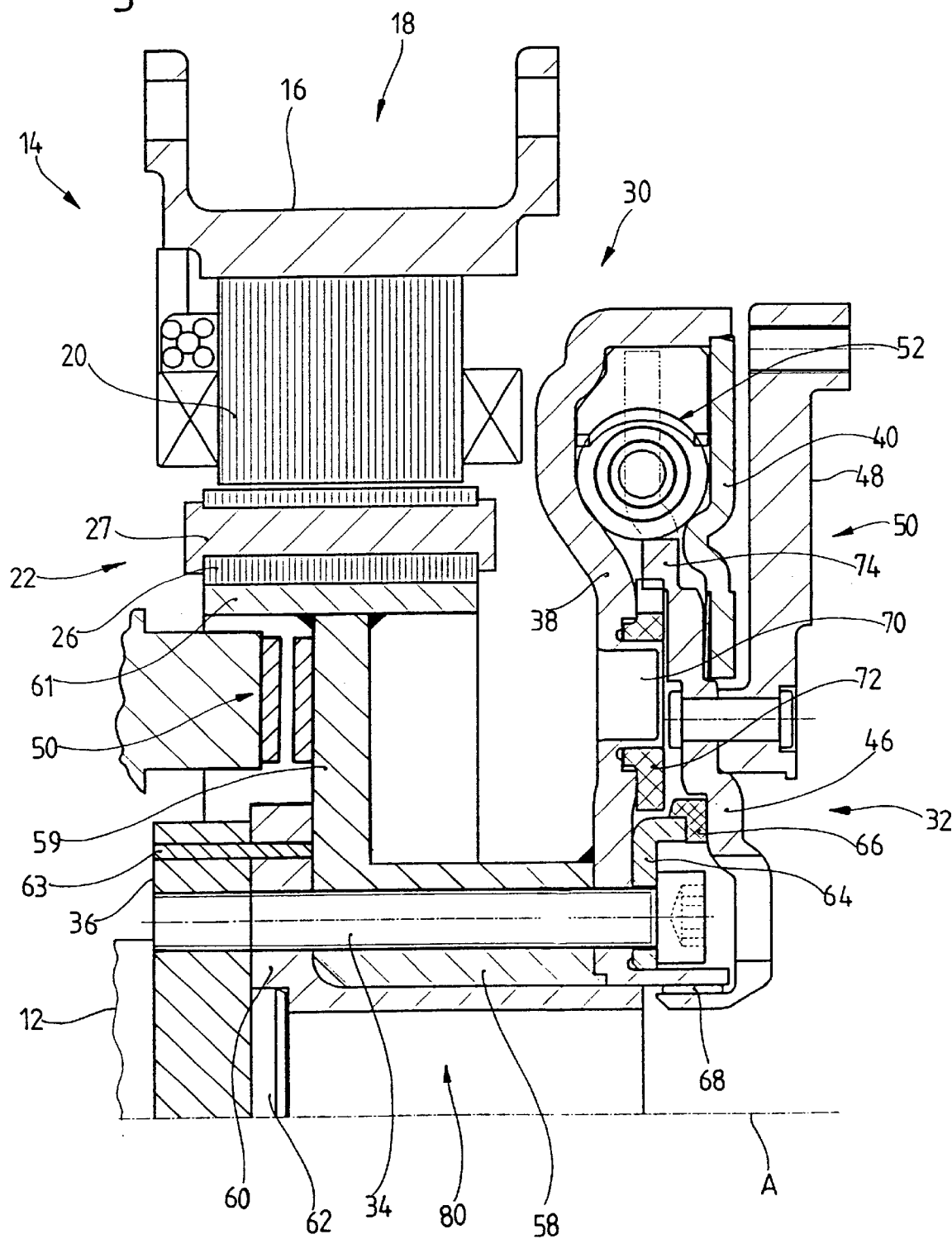
FIG. 2 shows a view, corresponding to that of FIG. 1, of an alternative embodiment.

A modification of the embodiment illustrated in FIG. 1 is shown in FIG. 2. It can be seen, there, that the rotor arrangement 22 is surrounded as an internal rotor by the stator arrangement 18 with its stator carrier 16 and with the stator coils 20. It can be seen, furthermore, that here, for example, the rotor arrangement 22 does not have any permanent-magnetically excited rotors, but the electric machine 14 is designed here as an asynchronous machine. That is to say, here, the rotor arrangement 22 once again comprises a plurality of rotor laminations 26 which are held together by means of a rotor cage 27. The magnetic field of the rotor arrangement 22 is generated here by induction. The rotor arrangement 22 is carried on the spacer sleeve 58 or on a flange-like projection 59 and a carrier element 61 arranged thereon and is thereby connected fixedly in rotation to the primary side 30 of the torsional vibration damper arrangement 32. The rotor arrangement 22 is once again secured to the crankshaft flange 36 of the crankshaft 12 by means of the screw bolts 34. Once again, as described above, beforehand the positive guidance sleeve 60 is centered on the drive shaft via the centering projection 62 and, for example, is held thereon by means of a so-called tension pin 63. This tension pin 63, in addition to its function for fixing the positive guide sleeve 60 to the drive shaft 12, also has the function of arranging the sleeve 60 in a suitable rotary position, so that the passage orifices provided in the positive guidance sleeve 60 are aligned with the threaded orifices provided in the crankshaft flange 36. Although FIG. 2 illustrates the tension pin 63 as lying in a radial line with a threaded orifice in the crankshaft flange, said tension pin may also be positioned in a circumferential direction between two threaded orifices of this type.

The embodiment illustrated in FIG. 2 otherwise corresponds to the embodiment described previously, particularly also with regard to the makeup of the torsional vibration damper arrangement 32 and the operation of assembling the rotor arrangement 22 together with the stator arrangement 18 in order to complete the electric machine 14.

Figure 3:
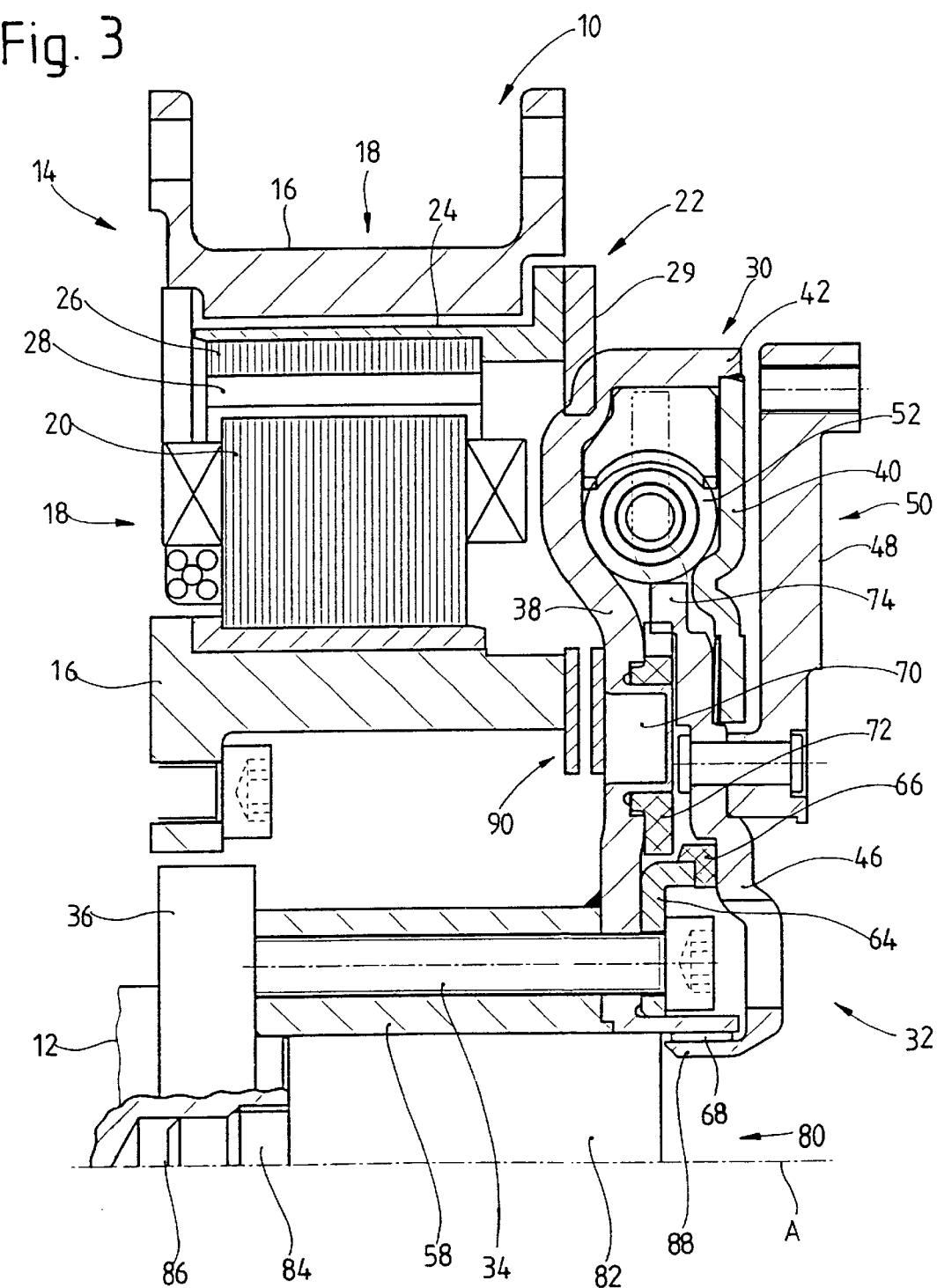
FIG. 3 shows a further view, corresponding to that of FIG. 1, of another embodiment with a positive guidance element positioned on a drive shaft.

A further modification of the embodiment, illustrated in FIG. 1, of a drive system with positive guidance is illustrated in FIG. 3. Since there is essentially structural identity to the drive system illustrated in FIG. 1 again here, only the differences are dealt with below. It can be seen that here, instead of the positive guidance sleeve as a positive guidance arrangement 80, a positive guidance extension 82 is provided which is inserted with a centering projection 84 into a central orifice 86 of the crankshaft 12 and is thus centered relative to the crankshaft. The positive guidance extension 82 thus extends axially and guides the spacer sleeve 58, which, for example, is welded, hard-soldered, screwed or riveted to the cover disk element 40 of the torsional vibration damper arrangement 32, during the movement of the rotor arrangement 22 up to the stator arrangement 18 already mounted beforehand via the stator carrier 16. By means of a sleeve-like portion 88 of the central disk element 46, said portion engaging over the cover disk element 40 radially on the inside and serving for radial mounting, after the electric machine 14 has been assembled, the positive guidance extension 82 is then held firmly in the cavity surrounded by the torsional vibration damper arrangement 32.

It may be pointed out that the positive guidance extension 82, which is illustrated in FIG. 3 as a separate component, could, of course, be produced integrally with a crankshaft 12, While it is produced as a separate component, the centering projection 84 may be provided on the positive guidance extension 82, for example with an external thread, and the centering orifice 86 in the crankshaft 12 may be provided with an internal thread, so that the positive guidance extension 82 is secured by being screwed in on the crankshaft 12 and rattling noises are thus avoided during subsequent rotary operation.

Figure 4:
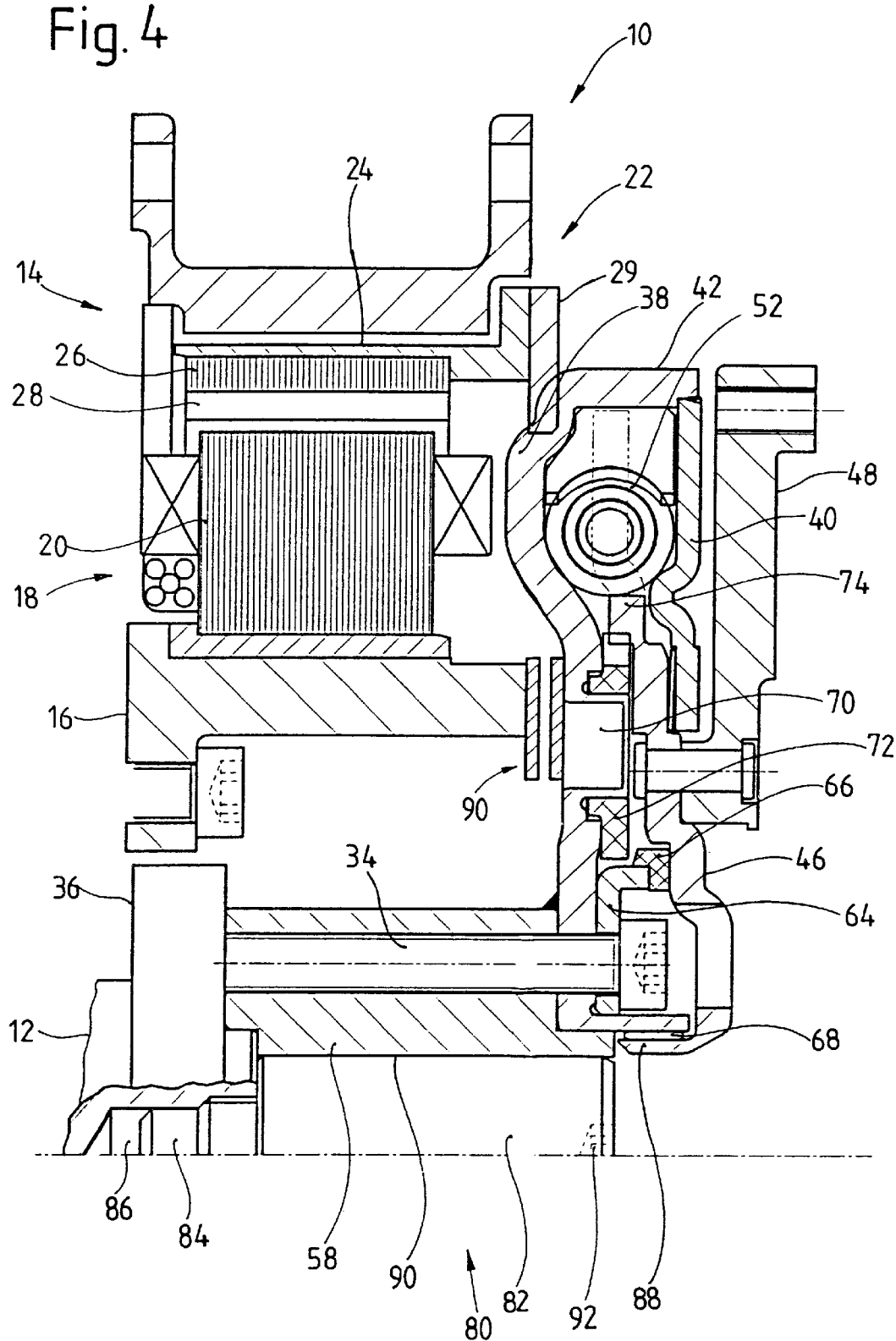
FIG. 4 shows a modification of the embodiment illustrated in FIG. 3.

A modification of this design variant is illustrated in FIG. 4. The essential difference, here, is that the cover disk element 40 is somewhat shortened inwardly in the length of its radial extent and therefore the sleeve-like portion 88 of the central disk element 46 does not project radially beyond an inner circumferential surface 91 of the spacer sleeve 58. It is thereby possible, after the electric machine 14 has been assembled, to take the positive guidance extension 82 out of the centering orifice 86 of the crankshaft 12 again, for example by an appropriate tool being introduced into a tool engagement formation 92, for example, by a screwing movement being executed, and thus to remove said positive guidance extension out of the region of the drive system 10 completely.

Figure 5:
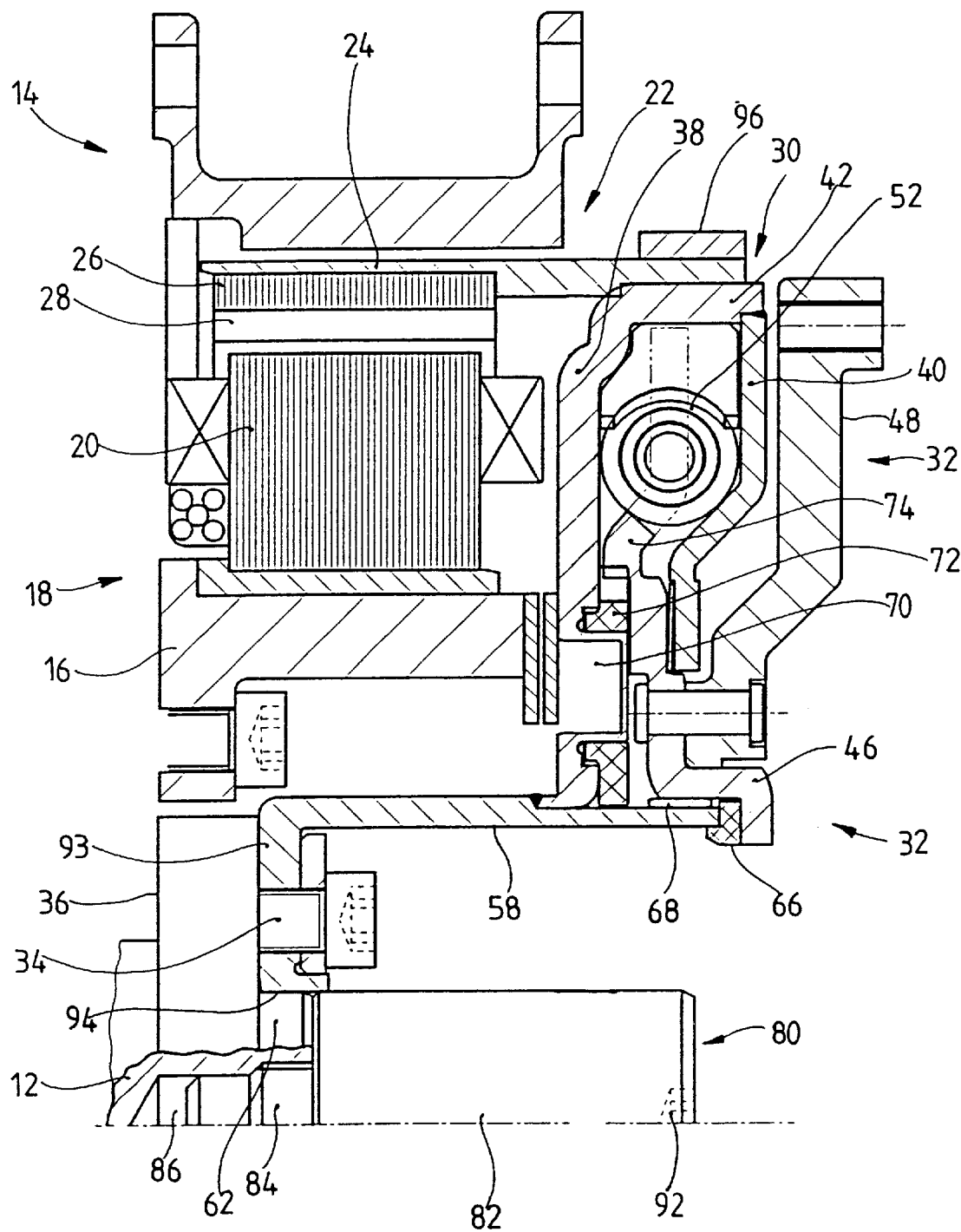
FIG. 5 shows a further modification of the embodiment illustrated in FIG. 3.

Another embodiment, in which the positive guidance arrangement 80 comprises a positive guidance extension 82 capable of being mounted on the crankshaft 12, is illustrated in FIG. 5. It can be seen, here, that the spacer sleeve 58 of the torsional vibration damper arrangement 32 has, on its end face designed for securing to the crankshaft flange 36, a radially inwardly projecting flange portion 93 which, in this case, is fixed to the crankshaft 12 by means of the screw bolts 34. When the electric machine 14 is being assembled, an inner circumferential surface 94 of this flange portion 93 is guided on the positive guidance extension 82 and ultimately comes to rest on the centering projection 62 of the crankshaft 12. After the guiding-up action has taken place, the positive guidance portion 82 can therefore be removed from the region of the crankshaft 12 again by the use of an appropriate tool.

It can also be seen in FIG. 5 that, in this case, the spacer sleeve 58 extends beyond its connection to the cover disk element 40 and in its end portion supports both the axial bearing 66 and the radial bearing 68, on which the central disk element 46 is mounted with a doubly angled radially inner region.

It may be pointed out that the spacer sleeve 58 may be provided in its longitudinal portion with slots or orifices, in order to make it elastic there, so that at least partial wobble uncoupling occurs between the drive shaft 12 and the torsional vibration damper arrangement 32 or the rotor arrangement 22.

It can also be seen, in the embodiment according to FIG. 5, that the rotor body 24, which is formed from aluminum, for example so as to provide a permeability jump in respect of a rotor interaction region formed essentially from the rotor laminations 26 and the permanent magnets 28, is mounted on an outer circumferential surface of the essentially cylindrical portion 42 of the torsional vibration damper arrangement 32, that is to say the primary side 30 thereof. This mounting may be carried out, for example, by shrinking on, this shrinkage connection being consolidated by a preferably likewise shrunk-on girdle, for example steel strap. The rotor body 24 formed from aluminum can thereby be firmly connected to the cover disk element 40 formed generally from sheet steel.

Figure 6:
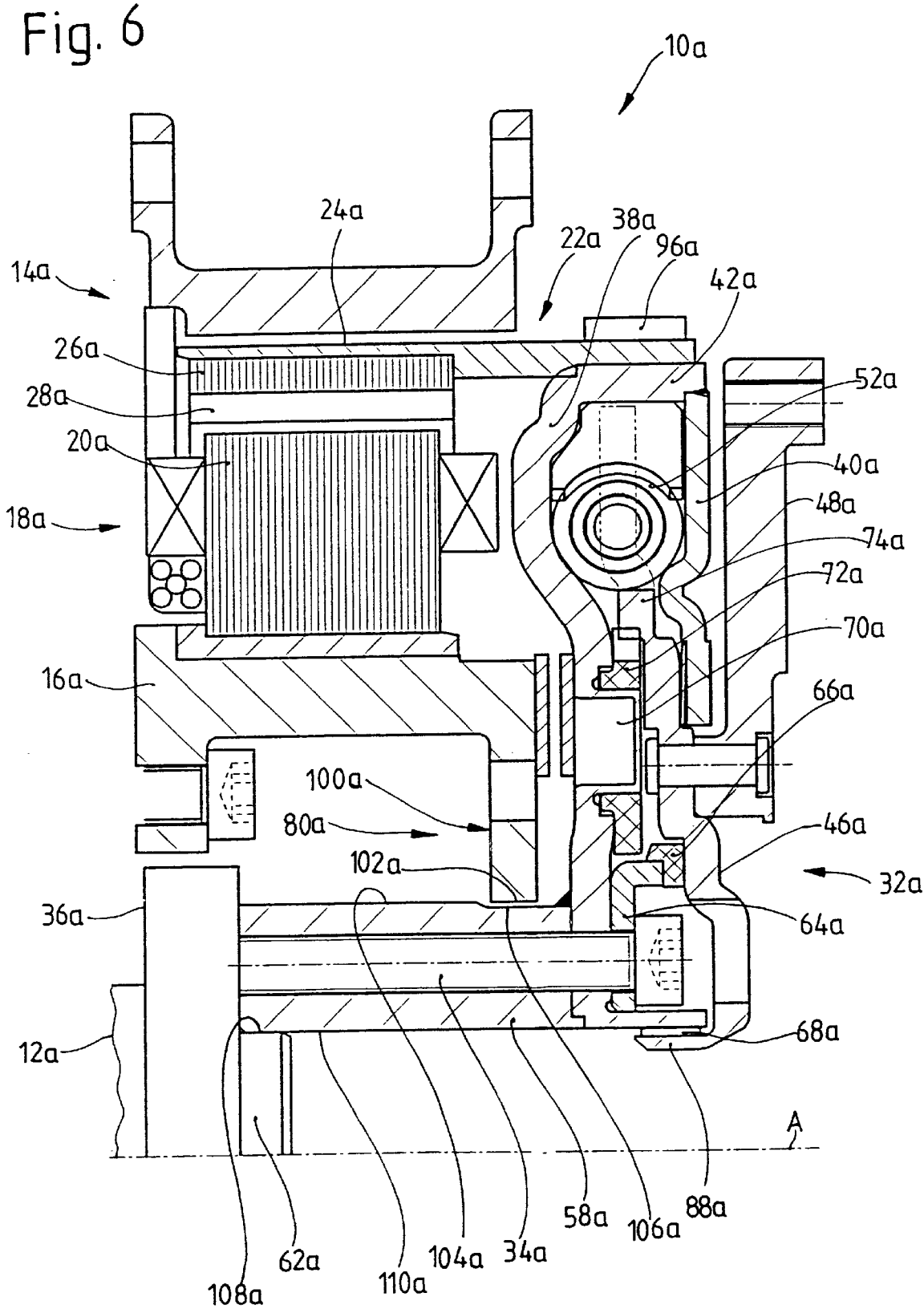
FIG. 6 shows a partial longitudinal sectional view of an alternative embodiment of the drive system according to the invention, in which positive guidance occurs between the stator arrangement and the rotor arrangement.

A second embodiment of a drive system according to the invention is illustrated in FIG. 6. Components which correspond to above-described components in terms of makeup or function are designated by the same reference symbols with the addition of an "a".

Whereas, in the embodiments described above with reference to FIGS. 1 to 5, positive guidance took place within the rotor arrangement, via the torsional vibration damper arrangement, and the crankshaft or a component connected to the latter, in the embodiment according to FIG. 6, the positive guidance arrangement 80a is designed for generating positive guidance interaction between the rotor arrangement 22a, here too, again, via the torsional vibration damper arrangement 32a which ultimately is to be assigned to the rotor arrangement, and the stator arrangement 18a. For this purpose, the stator arrangement 18a has on the stator carrier 16a a radially inwardly projecting positive guidance flange 100a as the first positive guidance region. An inner circumferential surface 102a forms a first positive guidance portion of this first positive guidance region 100a. In this design variant, the spacer sleeve 58a then forms a second positive guidance region, an outer circumferential surface 104a providing a second positive guidance portion 104a of this second positive guidance region 58a. When the rotor arrangement 22a is being moved up axially, the latter also comprising the torsional vibration damper arrangement 32a, the desired positive guidance is achieved by means of a highly accurate fit between the first positive guidance region 100a and the second positive guidance region 58a, that is to say the surface regions 102a and 104a, so that the appropriate airgap is maintained between the permanent magnet 28a of the rotor arrangement 22a and the stator coils 20a.

During rotary operation, however, the rotor arrangement 22a, together with the torsional vibration damper arrangement 32a, and the stator arrangement 18a must be capable of rotating relative to one another. However, if there were the least possible wobbling movements or rotational unevenness in the region of the crankshaft 12a, this highly accurate fit would lead to mutual abutment. In order to avoid this, there is formed in the positive guidance sleeve 58a, on its outer circumferential region, a step-like depression 106a which, when the electric machine 14a is in the assembled state, is located opposite the second positive guidance portion 102a, that is to say the inner surface 102a of the flange 100a. A sufficient interspace is thereby provided between the rotor arrangement 22a and the stator arrangement 18a. However, in order to ensure positive guidance, even in the end region of the axial movement of the rotor arrangement 22a up to the stator arrangement 18a which has already been secured previously, for example, to the engine block by means of its stator carrier 16a, a third positive guidance region in the form of the centering projection 62a of the crankshaft 12a is provided. An outer circumferential surface 108a of said projection forms a third positive guidance portion, on which an inner circumferential surface region 100a of the spacer sleeve 58a is guided, as the fourth positive guidance portion, in the end region of the axial moving-up of the rotor arrangement 22a. Thus, during the entire movement action, when the permanent magnets 28a and the stator coils 20a, which subassemblies form the portions which are critical in terms of mutual contact, overlap one another axially, positive guidance is ensured and the situation where these subassemblies come into contact with one another is thus prevented.

The embodiment illustrated in FIG. 6 otherwise corresponds again essentially to the design variant described with reference to FIGS. 1 to 5, so that reference is made to the statements set out above.

Figure 7:
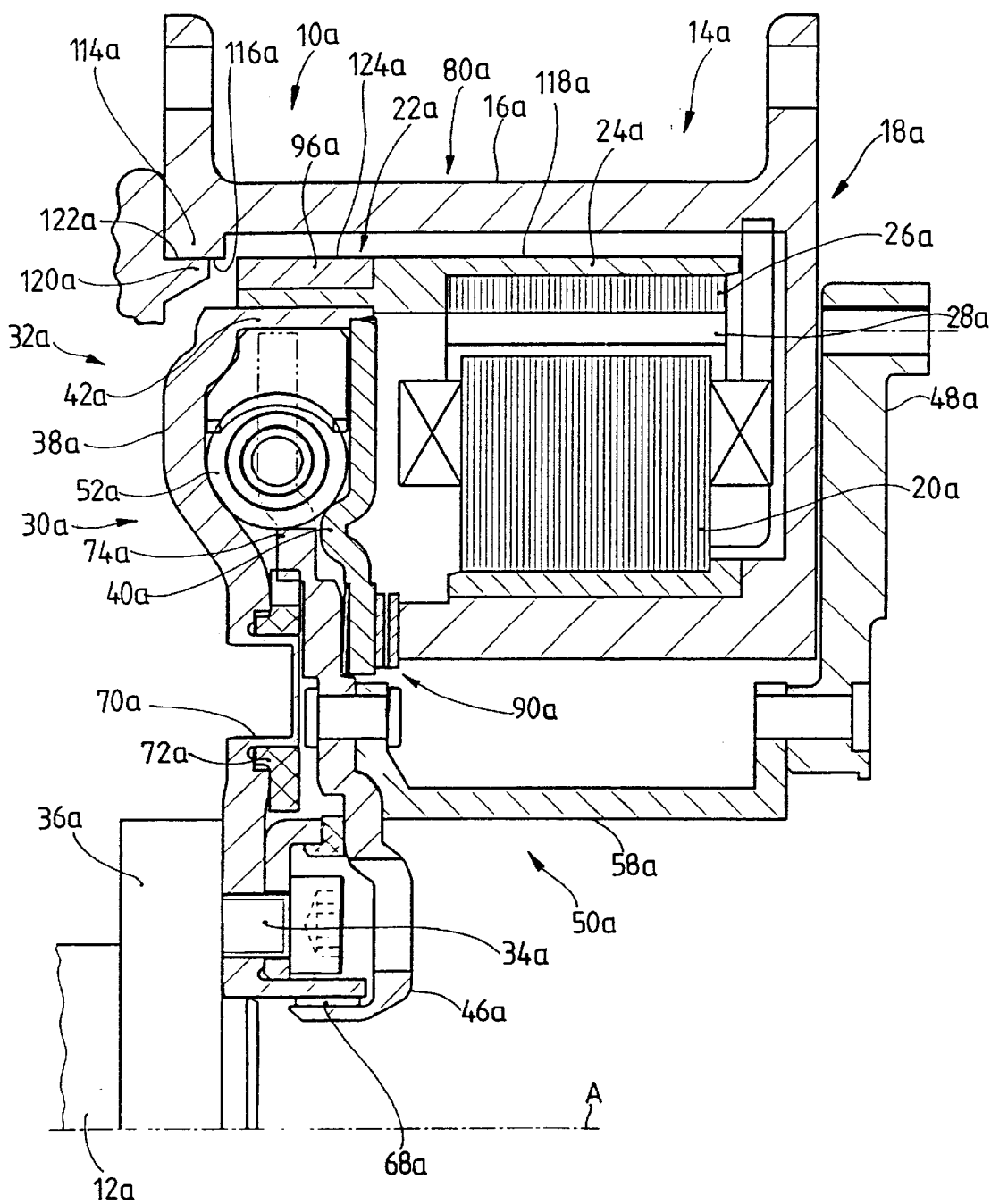
FIG. 7 shows a further embodiment of a drive system according to the invention, in which positive guidance likewise occurs between the stator arrangement and the rotor arrangement, but in a radially outer region.

A modification of the positive guidance principle illustrated in FIG. 6 is shown in FIG. 7. An essential difference in the first place is that the torsional vibration damper arrangement 32a of the rotor arrangement 22a is divided into two regions. An essential region, comprising the cover disk elements 40a, 38a, the damper spring arrangement 52a, the central disk element 46a and subassemblies interacting with these, is arranged directly contiguously to the crankshaft 12a. The cover disk element 38a of the primary side 30a is therefore screwed directly to the crankshaft flange 36a by means of the fastening screws 34a. In this case, the central disk element 46a has connected to it the spacer sleeve 58a which carries at its other axial end the flywheel 48a or, for example, is firmly connected directly to a transmission input shaft or to another part of the drivetrain. The cover disk element 38a once again carries, radially on the outside, the rotor body 24a which may, for example, be shrunk onto the cylindrical portion 42a and is fixed there by means of a likewise preferably shrunk-on girdle 96a. The spacer sleeve 58a thus bridges the interaction region of the stator arrangement, formed essentially by the stator coils 20a, or the interaction region of the rotor arrangement, formed essentially from the rotor laminations 26a and the permanent magnets 28a. This arrangement gives rise to a very short clamping length of the fastening screws 34a, thus resulting in increased clamping strength and a reduced risk that, during rotary operation, the clamping bond formed by the fastening screws 34a will be loosened as a result of the settling of various components.

It can be seen, in FIG. 7, that the stator carrier 16a, which at the same time also serves, for example, as an intermediate transmission case, has a ring-like design with an essentially U-shaped cross section. When this drive system 10a is being assembled, first the torsional vibration damper arrangement 32a is secured to the crankshaft flange 36a, in this state the flywheel or mass part 48a not yet being secured to the spacer sleeve 58a. The stator arrangement 18a is thereupon moved up axially, a radially inwardly projecting portion 114a of the stator carrier 16a forming a first positive guidance region which is positively guided with its inner circumferential surface 118a, as the first positive guidance portion, on an outer circumferential surface 118a of the rotor body 24a. The rotor body 24a thus forms a second positive guidance region and its outer circumferential surface 118a forms the second positive guidance portion. The arrangement of the projection 114a is such that, even before the assembled position of the electric machine 14a, as illustrated in FIG. 7, is reached, there is no longer any positive guidance interaction between the rotor arrangement 22a and the stator arrangement 18a, in order subsequently, during rotary operation, to lead to a free movably of these two subassemblies relative to one another. Positive guidance in the end region of the axial movement of the stator arrangement 18a is then assumed by an axially projecting portion 120a, for example, of the engine block, which forms a third positive guidance region. An outer circumferential surface 122a of this portion 120a lies essentially in a radial plane with the outer circumferential surface 118a of the rotor body 24a or with an outer circumferential surface 124a of the shrunk-on girdle 96a, if the latter is provided. The axial distance between the projection 120a and the rotor body 24a is dimensioned such that no loss of positive guidance interaction occurs at any moment during the positive guidance movement.

Particularly in an embodiment of this type, it is advantageous to connect the rotor body 24a to the torsional vibration damper arrangement 32a by shrinking on, since rivet connections or the like, which impede positive guidance, then do not have to be provided. If a fastening girdle 96a is used, this must be positioned in a corresponding depression of the rotor body 24a, so that positive guidance is also not impeded by this girdle 96a.

After the stator arrangement 18a has been moved axially beyond the rotor arrangement 22a in this way for the assembly of the electric machine 14a and has been secured, for example, to the engine block, the flywheel or the flywheel mass 48a is then firmly connected to the spacer sleeve 58a, for example by screwing or riveting.

It can be seen in FIG. 7 that the rotary-position transmitter 90a is located, here, axially in the region between the stator carrier 18a and the cover disk element 38a. The rotary-position transmitter could, of course, also act in the region between the cover disk element 38a and, for example, the engine block or another fixed component.

Figure 8:
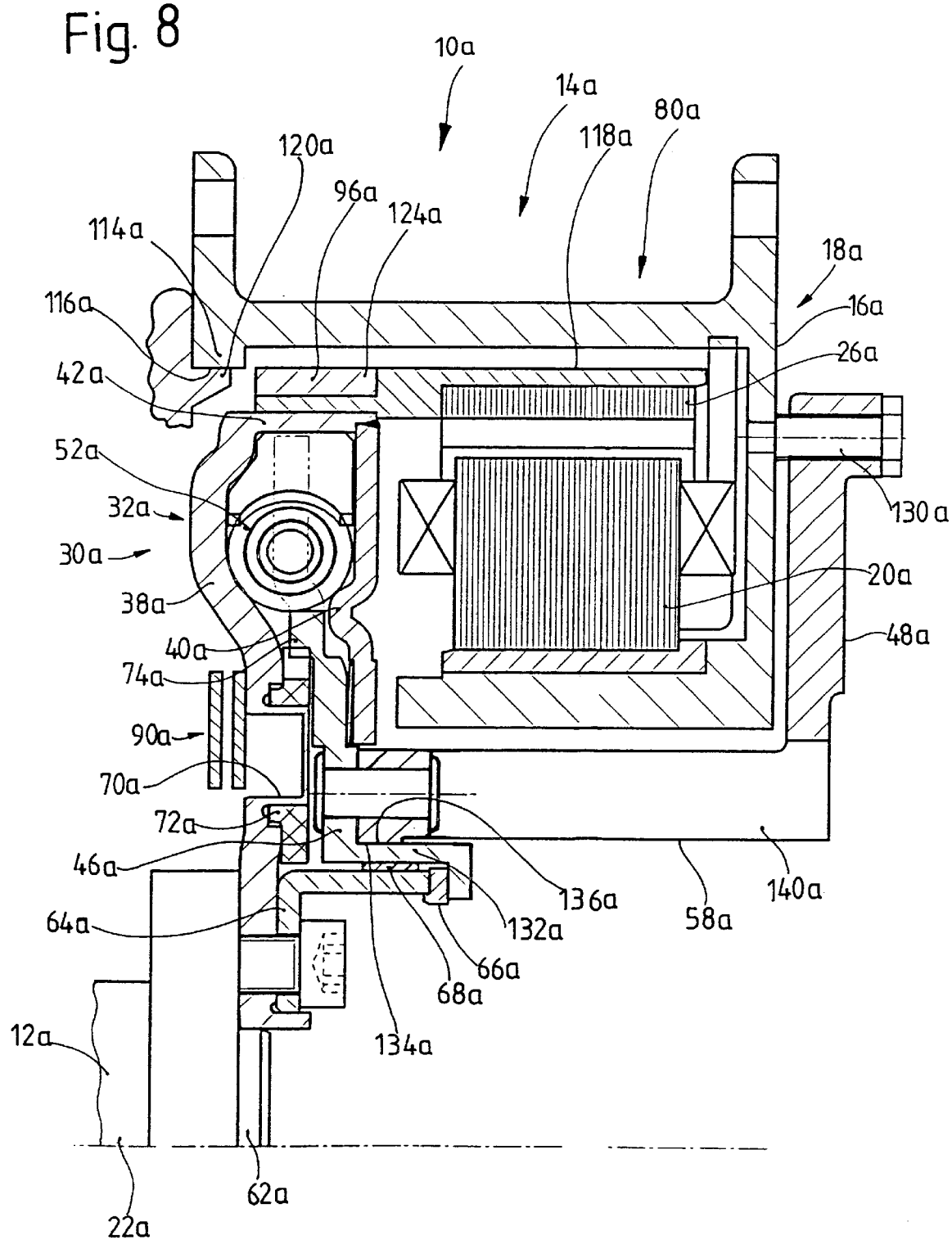
FIG. 8 shows a modification of the system illustrated in FIG. 7.

FIG. 8 shows an embodiment corresponding to FIG. 7, but, here, the electric machine 14a is combined with the rotor arrangement 22a, the stator arrangement 18a and the torsional vibration damper arrangement 32a as a premounted subassembly. The makeup is, once again, essentially as described above with reference to FIG. 7. The following procedure is then adopted for assembling the premounted subassembly. First, the flywheel or mass part 48a combined with the spacer sleeve 58a to form a subassembly is secured to the stator carrier 16a by means of screw bolts 130a. Then, as described above, the rotor arrangement 22a is previously or subsequently secured to the crankshaft 12a by means of the torsional vibration damper arrangement 32a. Likewise as described above, the stator arrangement 18a is thereafter moved axially with respect to rotor arrangement 22a, in this case, first, positive guidance interaction occuring between the inner surface 116a of the projection 114a on the stator carrier 16a on the outer circumferential surface 118a of the rotor body 24a or of the outer circumferential surface 124a of the girdle 96a. Since, here too, the dimensioning is such that, in the end region of the axial movement for assembling the electric machine 14a, this positive guidance interaction existing between the rotor arrangement 22a and stator arrangement 18a is no longer present, in this case, in the end region of this movement, the spacer sleeve 58a, in its end region distant from the flywheel 48a, is positively guided on its inner surface 134a by an axially extending sleeve-like portion 132a of the central disk element 46a. Here, therefore, the sleeve-like portion 132a of the central disk element 46a forms the third positive guidance region or its outer circumferential surface 136a forms a third positive guidance portion, along which a fourth positive guidance portion in the form of the inner circumferential or upper surface 134a of the spacer sleeve 58a is guided. Since, in this case, the spacer sleeve 58a is initially still to be assigned to the stator arrangement 18a in terms of subassemblies, correspondingly the fourth positive guidance portion in the form of the surface 134a is to be assigned to the first positive guidance portion 116a of the stator arrangement 18a.

The subassembly premounted in this way can then be attached axially to a drive assembly, centering taking place here by means of the projection 120a, for example, on the engine block or/and by means of the centering projection 62a of the drive shaft 12a.

It may also be pointed out here, furthermore, that the spacer sleeve 58a is not designed as a closed element. Instead, this spacer sleeve 58a has a plurality of axially extending arm portions 140a which succeed one another in the circumferential direction. These arm portions 140a may be inclined slightly or have a blade profile, so that, during rotary operation, cooling air is conveyed radially from inside into the region of the electric machine 14a. The connection of the spacer sleeve 58a to the central disk element 46a may be made by riveting, screwing or the like.

If the drive system illustrated in FIG. 8 is attached to a drive assembly, the screws 130a can then be released, so that the system is ready for operation.

Figure 9:
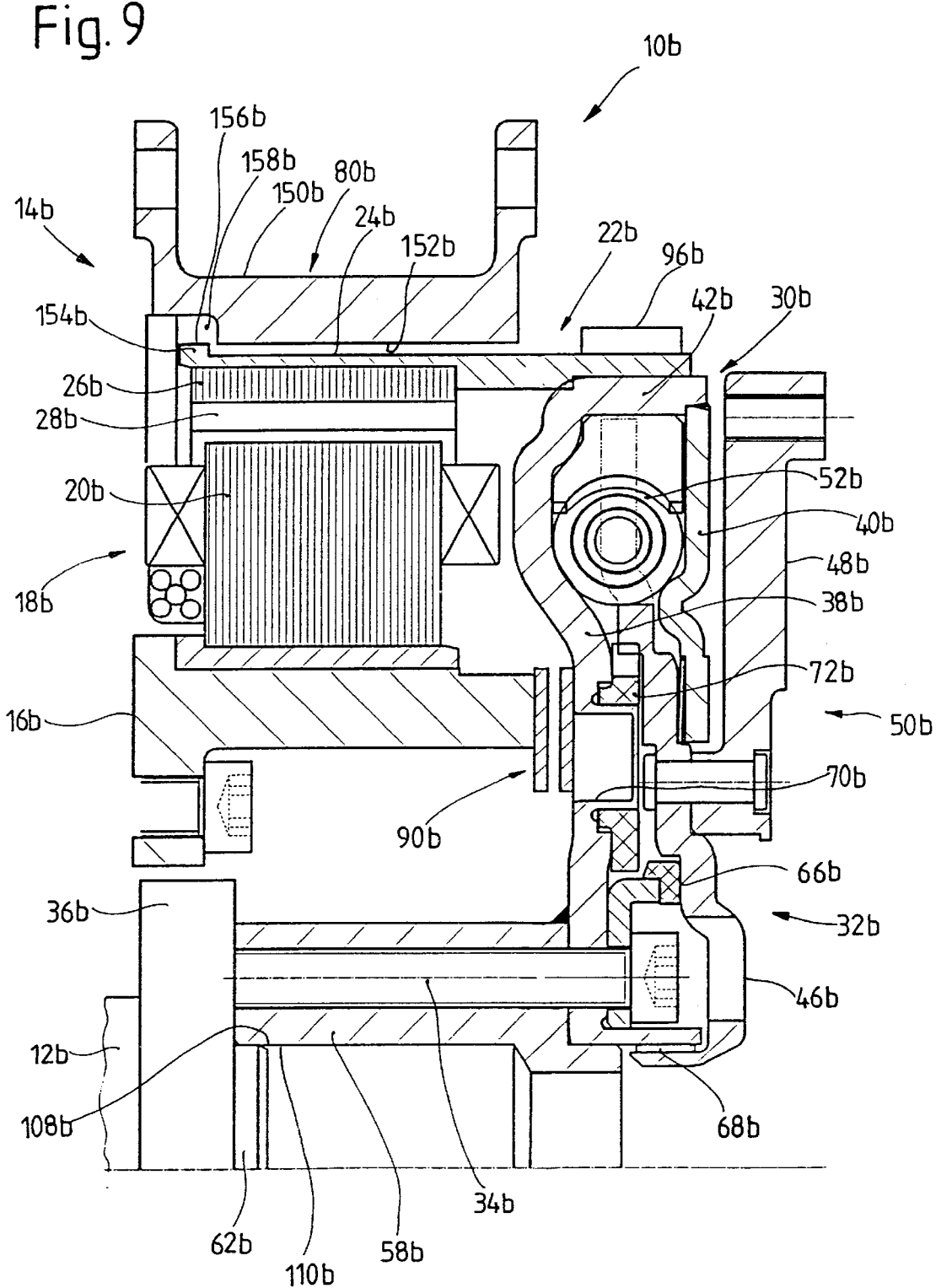
FIG. 9 shows a further partial longitudinal sectional view of a drive system according to the invention, in which positive guidance occurs between the rotor arrangement and a fixed component.

FIG. 9 shows a further embodiment of a drive system according to the invention. Components corresponding to an above-described component as regards makeup or function are described by the same reference symbols with the addition of a "b". Since the embodiment of FIG. 9 also corresponds in essential regions, in particular, to the embodiment described with reference to FIGS. 1 to 5, only the difference in design, particularly with regard to positive guidance, are dealt with below.

In the design variant illustrated in FIG. 9, positive guidance interaction is generated between the rotor arrangement 22b and a fixed component, for example an intermediate transmission case portion 150b secured or securable to an engine block and acting as the first positive guidance region. This intermediate transmission case portion 150b has an inner surface 152b as the first positive guidance portion. Provided on the rotor body 24b as the second positive guidance region is a radially outwardly projection portion 154b, the outer surface 156b of which forms a second positive guidance portion. Since the portion 154b is located in that region of the rotor arrangement 22b which is at the front when the rotor arrangement 22b is moved up to the stator arrangement 18b already arranged on an engine block or the like, care is taken, in the first place, to ensure positive guidance between the surfaces 152b, 156b. In the end region of this axial moving-up action, however, this positive guidance is cancelled again, since a radially outwardly directed depression 158b is provided in the case portion 150b. This depression 158b is located opposite the portion 154b in the ready-assembled state, so that, here again, free rotatability is provided between the rotor arrangement 22b and the case portion 150b.

In order to ensure positive guidance even in the end region of the axial movement of the rotor arrangement 22b up to the stator arrangement 18b, the centering projection 62b on the crankshaft 12b forms a third positive guidance region, of which the third positive guidance portion 108b in the form of the outer surface 108b then guides the inner surface 100b of the spacer sleeve 58b as the fourth positive guidance portion 100b, in which case the fourth positive guidance portion is to be assigned to the second positive guidance region 154b in subassembly terms.

Figure 10:
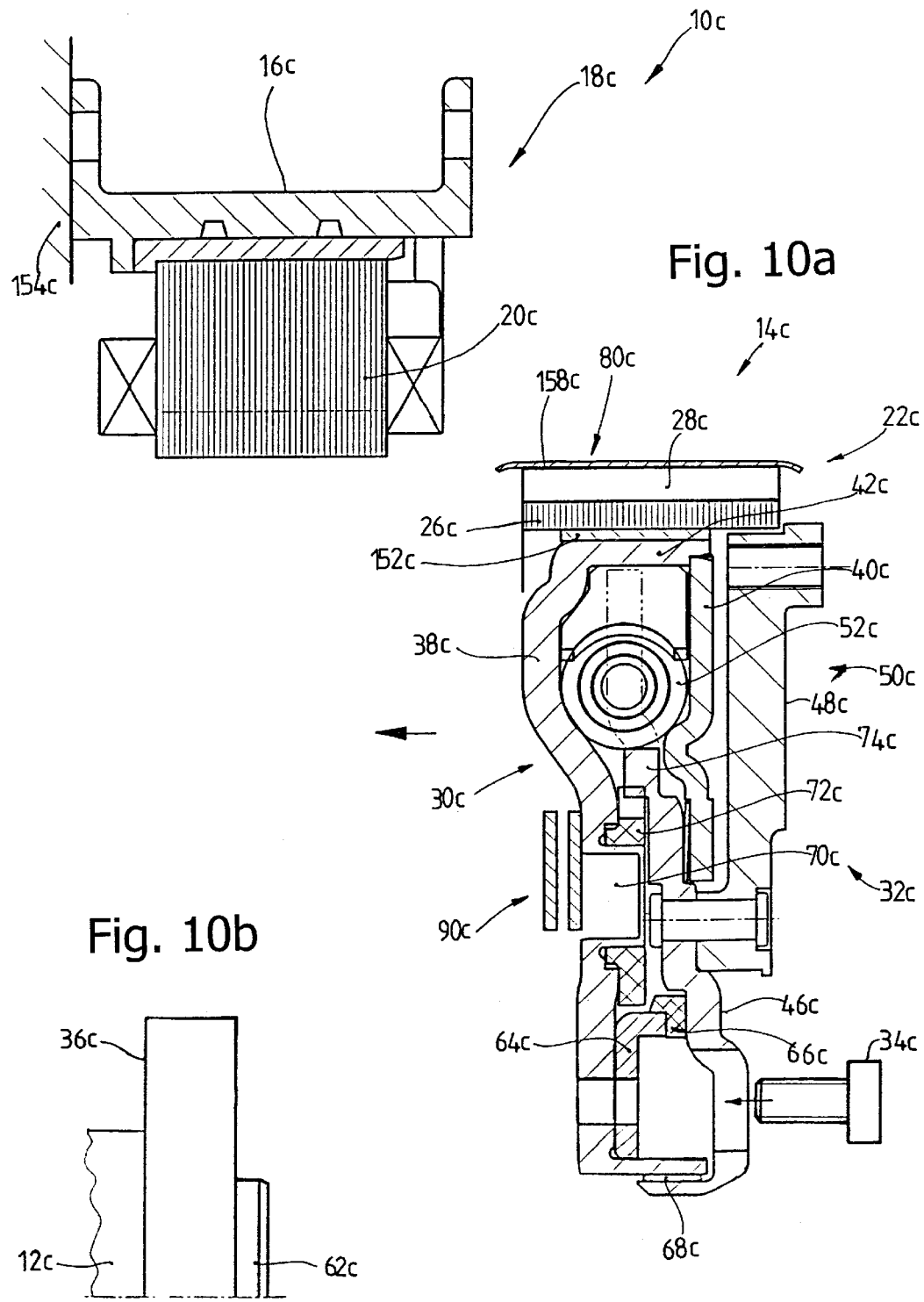
Figure 11:
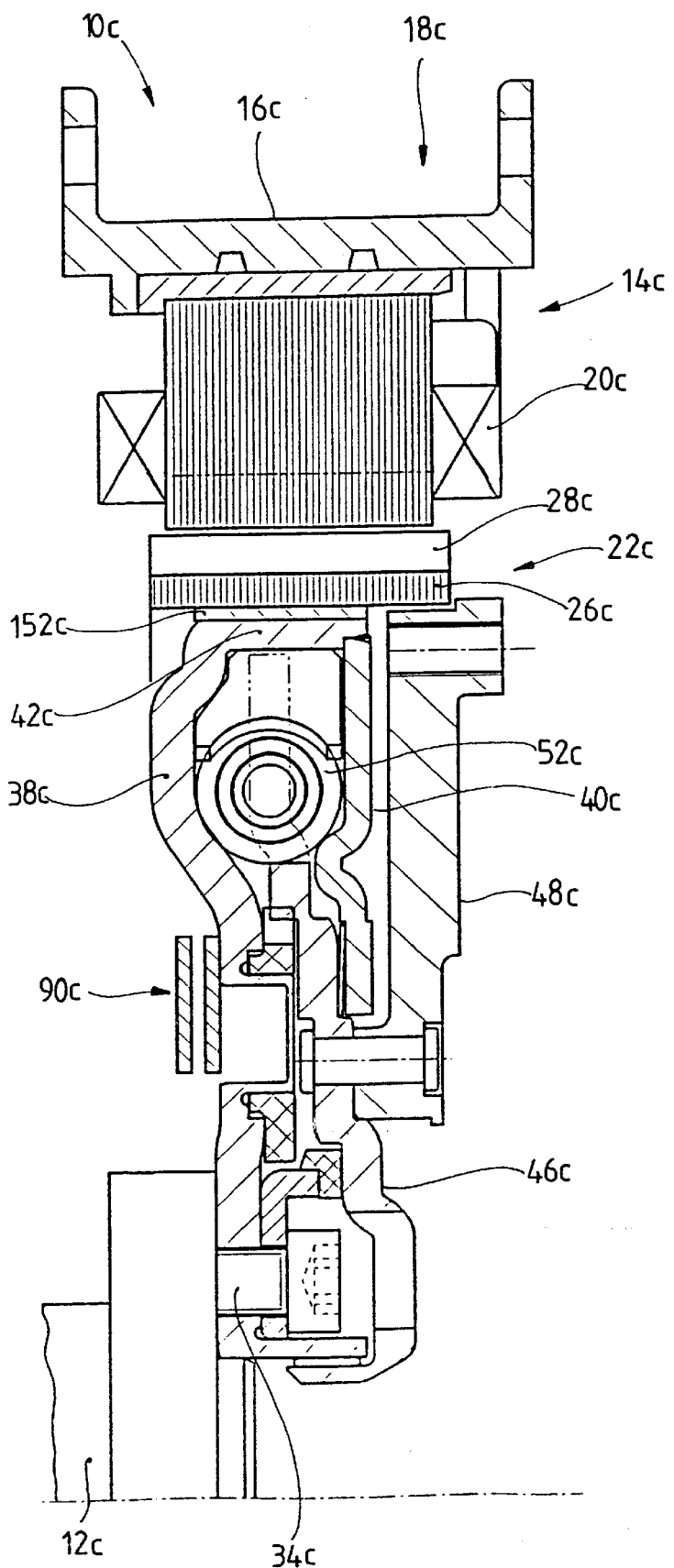
FIG. 11 shows the system illustrated in FIG. 10, after the assembly operation has been carried out.

FIGS. 10 and 11 show a further embodiment of a drive system according to the invention or of a positive guidance variant when a drive system of this type is being assembled. Components corresponding to above-described components with regard to makeup or function are designated by the same reference symbol with the addition of a "c".

FIGS. 10-10b show the drive system 10c or the electric machine 14c of the latter in the not yet assembled state.

The rotor arrangement 22c, that is to say the rotor laminations 26c combined to form a stack and having the permanent magnets 28c carried on them, are mounted on the essentially cylindrical portion 42c of the cover disk element 38c on the torsional vibration damper arrangement 32c, for example by being shrunk-on, with a layer 152c being interposed, consisting of material with a permeability lower than that of the rotor laminations 26c. Before this rotor arrangement 22c, comprising the torsional vibration damper arrangement 32c, is guided axially up to the stator arrangement 18c with its stator coils 20c, which is already mounted on the diagrammatically illustrated engine block 154c, or up to the drive shaft 12c, the outer circumferential surface of the rotor arrangement 22c, that is to say, essentially, the outer circumferential surface of the permanent magnets 28c or of the rotor laminations 26c, is covered by an essentially sock-like elastic positive guidance element 158c which here forms the positive guidance arrangement 80c. This positive guidance element, which is of hollow-cylindrical design, for example also with a net-like structure, is tensioned due to its own elasticity on the outer circumferential region of the rotor arrangement 22. The thickness of this positive guidance element 158c is dimensioned such that it fills an airgap, to be formed subsequently between the rotor arrangement 22c and the stator arrangement 18c, virtually completely, for example with the exception of 0.2 mm in the case of an airgap size of about 1 mm. This ensures that the rotor arrangement 22c and the stator arrangement 18c cannot come into direct contact in their critical regions, so as to avoid damage. Due to the interspace which is necessarily maintained, the magnetic forces are still sufficiently low, even when the positive guidance element 156c comes to bear on the rotor coils 20c, so that the rotor arrangement 22c can be moved further toward the drive shaft 12c axially, and, when the cover disk element 40c has been centered on the centering projection 62c, can be firmly screwed thereto by means of the fastening screws 34c, as illustrated ultimately in FIG. 11.

After the rotor arrangement 22c has been secured to the drive shaft 12c, the positive guidance element 158c is then drawn off axially and can be used for a further mounting operation.

In order to allow the movement of the rotor arrangement 22c up to the stator arrangement 18c or the axial movement past the latter, the positive guidance element 158c is preferably produced from a material with a low coefficient of friction, for example from Teflon (registered trademark).

This embodiment of a positive guidance arrangement 80c is suitable particularly in the design, illustrated in FIGS. 10 and 11, of the electric machine with an internal rotor and with a radially staggered arrangement of the electric machine 14c and torsional vibration damper arrangement 32c, since, in this case, the drawing off of the positive guidance element 158c is not impeded by any further components, in particular not even by the flywheel mass 48c of the secondary side 50c. Even with other arrangements, however, it is fundamentally possible for a positive guidance element 158c of this type also to be used, for example with regard to an external rotor, in which case, however, positioning takes place on an outer circumferential surface of the stator arrangement. It would also be conceivable, in principle, to secure a positive guidance element formed from somewhat more rigid material to an inner circumferential surface, for example to the stator arrangement illustrated in FIG. 10.

It may be pointed out that the above-described possibilities for positive guidances, which are illustrated in each case in separate embodiments, may, of course, also be used in interaction with one another. Furthermore, it may also be pointed out, in general terms, that, in the embodiments described above, the stator carrier may be connected to a ring, for example aluminum ring, carrying the individual stator coils, by shrinking on or shrinking in and may have a cooling duct system for conducting a cooling fluid.

It may also be pointed out, furthermore, that, insofar as reference is made, here, to the fact that various components of the rotor arrangement are mounted on the drive shaft, this mounting may take place directly or with other components or subassemblies, in particular components or subassemblies of the torsional vibration damper arrangement, being interposed.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

We claim:

1. A drive system, comprising: a drive shaft; an electric machine via which the drive shaft is drivable in rotation and electric energy is capable of being recovered during rotation of the drive shaft, the electric machine having a stator arrangement and a rotor arrangement connectable to the drive shaft for joint rotation about an axis of rotation; and a guidance arrangement arranged to guide the rotor arrangement and the stator arrangement relative to one another when a relative axial movement for assembling and dismantling the electric machine is carried out, the guidance arrangement comprising a guidance unit, guidance interaction being generated between the rotor arrangement and the guidance unit which is positionable in a predetermined position on the drive shaft.

2. A drive system as defined in claim 1, wherein the guidance unit is positionable in the predetermined position before the rotor arrangement is moved axially up to the stator arrangement, the rotor arrangement having a guidance portion guidable along the guidance unit.

3. A drive system as defined in claim 2, wherein, after axial guidance of the rotor arrangement relative to the stator arrangement has taken place, the guidance unit is held together with the rotor arrangement on the drive shaft.

4. A drive system as defined in claim 2, wherein the guidance unit is configured to be removable from the region of the rotor arrangement after axial guidance of the rotor arrangement relative to the stator arrangement has taken place.

5. A drive system as defined in claim 1, wherein the drive shaft has a positioning arrangement arranged so as to position the guidance unit in the predetermined position with respect to the drive shaft.

6. A drive system as defined in claim 1, wherein the guidance arrangement is configured to generate guidance interaction between the stator arrangement and the rotor arrangement.

7. A drive system as defined in claim 6, wherein the guidance arrangement comprises a first guidance region on the stator arrangement and a second guidance region on the rotor arrangement, said second guidance region being guided along the first guidance region during relative axial movement between the stator arrangement and the rotor arrangement.

8. A drive system as defined in claim 7, wherein the first guidance region comprises a first guidance portion on the stator arrangement, and the second guidance region comprises a second guidance portion on a portion of the rotor arrangement, said portion of the rotor arrangement being connectable to the drive shaft.

9. A drive system as defined in claim 8, wherein the first and second guidance portions are configured so that during assembly of the electric machine essentially no guidance between the stator arrangement and the rotor arrangement is provided in an end region of the relative axial movement of the rotor arrangement with respect to the stator arrangement.

10. A drive system as defined in claim 9, wherein the guidance arrangement comprises a third guidance region, in an end region of the relative axial movement at least one of the first guidance region and the second guidance region being configured to provide, together with the third guidance region, guidance of the stator arrangement relative to the rotor arrangement.

11. A drive system as defined in claim 10, wherein the third guidance region is provided on the drive shaft and comprises a third guidance portion, and wherein the second guidance region on the rotor arrangement comprises a fourth guidance portion for interaction with the third guidance portion.

12. A drive system as defined in claim 11, wherein the third guidance region comprises an axial projection on the drive shaft, with a surface region as the third guidance portion, and wherein the second guidance region comprises as the fourth guidance portion a surface region of an essentially cylindrical portion of the rotor arrangement.

13. A drive system as defined in claim 12, wherein the third guidance portion is an outer surface region of the axial projection and the fourth guidance portion is an inner surface region of the cylindrical portion of the rotor arrangement.

14. A drive system as defined in claim 11, wherein the rotor arrangement and the stator arrangement are configured to form a combined premounted subassembly after relative axial movement between the rotor arrangement and the stator arrangement has been carried out for assembly of the electric machine.

15. A drive system as defined in claim 10, wherein the third guidance region is provided on a fixed component and comprises a third guidance portion, the first guidance region having a fourth guidance portion for interaction with the third guidance portion on the fixed component.

16. A drive system as defined in claim 15, wherein the fourth guidance portion is formed by the first guidance portion.

17. A drive system as defined in claim 15, wherein the third guidance region comprises as the third guidance portion a surface region of a fixed component, and wherein the first guidance region comprises as the fourth guidance portion a surface region of the stator arrangement.

18. A drive system as defined in claim 17, wherein the third guidance portion is an outer surface region of the fixed component, and the fourth guidance portion is an inner surface region of the stator arrangement.

19. A drive system as defined in claim 17, wherein the third guidance portion and the second guidance portion comprise surface regions adjoining one another essentially flush.

20. A drive system as defined in claim 8, wherein the stator arrangement includes a stator carrier having a surface region which forms the first guidance portion of the first guidance region, the rotor arrangement having an essentially cylindrical portion which has a surface region that forms the second guidance portion of the second guidance region, the second guidance portion being displacable along the first guidance portion.

21. A drive system as defined in claim 20, wherein the surface region of the stator carrier which forms the first guidance portion is an inner surface region of the stator carrier, and the second guidance portion is an outer surface region of the rotor arrangement.

22. A drive system as defined in claim 20, wherein the third guidance portion and the second guidance portion comprise surface regions adjoining one another essentially flush.

23. A drive system as defined in claim 1, wherein the guidance arrangement is configured so as to generate guidance interaction between the rotor arrangement and a fixed component.

24. A drive system as defined in claim 23, wherein the fixed component is provided on a drive assembly.

25. A drive system as defined in claim 23, wherein the fixed component has a first guidance region, and wherein the rotor arrangement comprises a second guidance region which is guided along the first guidance region during relative axial movement between the rotor arrangement and the stator arrangement.

26. A drive system as defined in claim 25, wherein the first guidance region comprises a first guidance portion, and wherein the second guidance region comprises a second guidance portion for interaction with the first guidance portion.

27. A drive system as defined in claim 26, wherein the first guidance region comprises as the first guidance portion a surface region of the fixed component, and wherein the second guidance region comprises as the second guidance portion a surface region of an essentially cylindrical portion of the rotor arrangement.

28. A drive system as defined in claim 27, wherein the first guidance portion is an inner surface region of the fixed component and the second guidance portion is an outer surface region of the essentially cylindrical portion of the rotor arrangement.

29. A drive system as defined in claim 25, wherein the first and second guidance portions are configured to provide essentially no guidance between the stator arrangement and the rotor arrangement in an end region of relative axial movement of the rotor arrangement with respect to the stator arrangement during assembly of the electric machine.

30. A drive system as defined in claim 29, wherein the guidance arrangement comprises a third guidance region, at least one of the first guidance region and the second guidance region being configured to provide, together with the third guidance region, guidance of the stator arrangement relative to the rotor arrangement in the end region of the relative axial movement.

31. A drive system as defined in claim 30, wherein the third guidance region is provided on the drive shaft and comprises a third guidance portion, and wherein the second guidance region on the rotor arrangement comprises a fourth guidance portion for interaction with the third guidance portion.

32. A drive system as defined in claim 31, wherein the third guidance region comprises an axial projection on the drive shaft, with a surface region as the third guidance portion, and wherein the second guidance region comprises as the fourth guidance portion a surface region of an essentially cylindrical portion of the rotor arrangement.

33. A drive system as defined in claim 32, wherein the third guidance portion is an outer surface region of the axial projection and the fourth guidance portion is an inner surface region of the essentially cylindrical portion.

34. A drive system as defined in claim 1, wherein the stator arrangement and the rotor arrangement are configured and arranged so as to at least partially overlap one another axially.

35. A drive system as defined in claim 1, wherein the guidance arrangement comprises a guidance element which, before the rotor arrangement and the stator arrangement are moved axially toward one another, is arranged on a surface region, to be positioned facing the stator arrangement, of the rotor arrangement.

36. A drive system as defined in claim 35, wherein the guidance element is essentially a hollow-cylindrical element produced from elastic material.

37. A drive system as defined in claim 35, wherein the guidance element has a net-like structure.

38. A drive system as defined in claim 35, wherein the guidance element has a thickness which is slightly smaller than an air gap formed between the rotor arrangement and the stator arrangement in an assembled state.

39. A drive system as defined in claim 38, wherein the guidance element has a thickness which is 0.2 mm smaller than the air gap.

40. A drive system as defined in claim 1, wherein the guidance arrangement comprises a guidance element which, before the rotor arrangement and the stator arrangement are moved axially toward one another, is arranged on a surface region, to be positioned facing the rotor arrangement, of the stator arrangement.

41. A method for assembling and dismantling a rotor arrangement and a stator arrangement of an electric machine, by means of which electric machine a drive shaft of a drive assembly is drivable in rotation and electric energy is recoverable during the rotation of the drive shaft, the method comprising the step of moving the rotor arrangement and the stator arrangement relative to one another, in a direction of an axis of rotation, during which relative movement the rotor arrangement and the stator arrangement are guided relative to one another, the relative axial movement between the rotor arrangement and stator arrangement for assembling the electric machine being carried at before mounting the rotor arrangement on the drive shaft and before mounting the stator arrangement on a fixed subassembly.

42. A method as defined in claim 41, further including mounting the rotor arrangement on the drive shaft before the relative axial movement between the rotor arrangement and the stator arrangement is carried out.

43. A method as defined in claim 41, further including mounting the stator arrangement on a fixed subassembly before the relative axial movement between the rotor arrangement and the stator arrangement is carried out.

* * * * *